US009621302B2

(12) United States Patent
Lim et al.

(10) Patent No.: US 9,621,302 B2
(45) Date of Patent: Apr. 11, 2017

(54) APPARATUS AND METHOD FOR RESOURCE SEGMENTATION IN WIRELESS COMMUNICATION SYSTEM

(75) Inventors: Chi-Woo Lim, Suwon-si (KR); Ji-Yun Seol, Seongnam-si (KR); Sung-Eun Park, Seoul (KR)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 819 days.

(21) Appl. No.: 12/804,848

(22) Filed: Jul. 30, 2010

(65) Prior Publication Data
US 2011/0296270 A1    Dec. 1, 2011

(30) Foreign Application Priority Data
May 28, 2010 (KR) .................. 10-2010-0050276

(51) Int. Cl.
*H04L 1/00* (2006.01)
(52) U.S. Cl.
CPC .................. *H04L 1/0041* (2013.01)
(58) Field of Classification Search
CPC ............... H04W 72/04; H04W 72/042; H04W 72/0446; H04W 72/12; H04W 28/06; H04L 5/0007; H04L 5/0053; H04L 5/0048; H04L 5/0044; H04L 27/2626; H04L 27/2627; H04L 27/2628; H04L 1/004; H04L 5/0064; H04L 1/0028
USPC ....... 370/310, 319, 322, 329, 330, 341, 334, 370/343, 344, 464, 465, 470, 471, 474, 370/478, 480, 485, 230.1, 310.2, 328; 455/452.1, 450
See application file for complete search history.

(56) References Cited

U.S. PATENT DOCUMENTS

| | | | | |
|---|---|---|---|---|
| 7,953,115 B2 * | 5/2011 | Nataga | .................. | H04W 28/06 370/465 |
| 8,159,930 B1 * | 4/2012 | Sampath | ............... | H04L 1/0606 370/206 |
| 8,397,126 B2 * | 3/2013 | Xu et al. | ...................... | 714/758 |
| 8,428,606 B1 * | 4/2013 | Vrzic | ................ | H04W 72/0406 370/335 |
| 9,240,877 B2 * | 1/2016 | Gorokhov | ............. | H04L 5/0044 |
| 2003/0063556 A1 * | 4/2003 | Hernandez | .................... | 370/208 |
| 2003/0152058 A1 * | 8/2003 | Cimini et al. | ................ | 370/338 |
| 2004/0062321 A1 * | 4/2004 | Nakamura | .............. | H04J 13/00 375/295 |

(Continued)

OTHER PUBLICATIONS

Lim, et al.; "Proposed Changes to the Resource Segmentation"; IEEE Broadband Wireless Access Working Group; http://ieee802.org/16/tgm; Mar. 5, 2010; 2 pages.

(Continued)

*Primary Examiner* — Wutchung Chu

(57) ABSTRACT

An apparatus and a method segment an allocated resource in data transmission in a wireless communication system. When a size of transmission data is large, the data information bit is distributed to one or more forward error correction (FEC) blocks with consideration of a size of the data information bit. A number of data tones is determined based on control information with respect to each of the one or more FEC blocks. The data information bit distributed to the one or more FEC blocks is mapped into a data tone with consideration of the number of data tones determined for each of the one or more FEC blocks.

16 Claims, 8 Drawing Sheets

(56) References Cited

U.S. PATENT DOCUMENTS

| | | | |
|---|---|---|---|
| 2005/0034053 A1* | 2/2005 | Jacobsen et al. | 714/800 |
| 2005/0044206 A1* | 2/2005 | Johansson et al. | 709/224 |
| 2005/0084000 A1* | 4/2005 | Krauss | H04B 7/068 375/148 |
| 2005/0163194 A1* | 7/2005 | Gore | H04B 1/7143 375/132 |
| 2006/0083210 A1* | 4/2006 | Li et al. | 370/343 |
| 2006/0109810 A1* | 5/2006 | Au | H04L 1/1819 370/328 |
| 2006/0209973 A1* | 9/2006 | Gorokhov | H04L 5/0048 375/260 |
| 2006/0274691 A1* | 12/2006 | Naguib | H04L 5/0023 370/330 |
| 2006/0285503 A1* | 12/2006 | Mese | H04L 1/0017 370/254 |
| 2007/0009054 A1* | 1/2007 | Kwak | H04L 5/023 375/260 |
| 2007/0049199 A1* | 3/2007 | Lim et al. | 455/63.1 |
| 2007/0061433 A1* | 3/2007 | Reynolds et al. | 709/223 |
| 2007/0166969 A1* | 7/2007 | Yanagi | H01L 21/823807 438/514 |
| 2007/0183308 A1* | 8/2007 | Korobkov et al. | 370/208 |
| 2007/0291640 A1* | 12/2007 | Zhang et al. | 370/210 |
| 2008/0019314 A1* | 1/2008 | Gorokhov | H04B 1/7075 370/330 |
| 2008/0107087 A1* | 5/2008 | Kwon | H04B 1/707 370/335 |
| 2008/0130612 A1* | 6/2008 | Gorokhov | H04W 72/0413 370/342 |
| 2008/0165969 A1* | 7/2008 | Khandekar | H04J 13/10 380/270 |
| 2008/0167040 A1* | 7/2008 | Khandekar | H04L 5/0053 455/436 |
| 2008/0181181 A1* | 7/2008 | Gorokhov | H04B 1/707 370/335 |
| 2008/0186931 A1* | 8/2008 | Prakash | H04W 28/24 370/338 |
| 2008/0205333 A1* | 8/2008 | Budianu | H04W 72/1231 370/329 |
| 2008/0240159 A1* | 10/2008 | Palanki | H04L 47/15 370/474 |
| 2008/0298492 A1* | 12/2008 | Hwang et al. | 375/260 |
| 2009/0010238 A1* | 1/2009 | Barak et al. | 370/342 |
| 2009/0122901 A1* | 5/2009 | Choi | H04L 5/0007 375/267 |
| 2009/0161618 A1* | 6/2009 | Johansson et al. | 370/329 |
| 2009/0227260 A1* | 9/2009 | Anreddy et al. | 455/450 |
| 2009/0257520 A1* | 10/2009 | Lin | H04L 5/0048 375/260 |
| 2009/0285168 A1* | 11/2009 | Choi et al. | 370/329 |
| 2010/0085985 A1* | 4/2010 | Pekonen et al. | 370/474 |
| 2010/0110874 A1* | 5/2010 | Kang et al. | 370/208 |
| 2010/0111014 A1* | 5/2010 | Kang et al. | 370/329 |
| 2010/0278278 A1* | 11/2010 | Lee et al. | 375/267 |
| 2010/0309781 A1* | 12/2010 | Wang | H04B 7/0871 370/229 |
| 2010/0309854 A1* | 12/2010 | Wu | H04B 7/0413 370/329 |
| 2010/0322066 A1* | 12/2010 | Chun et al. | 370/210 |
| 2011/0002279 A1* | 1/2011 | Yang et al. | 370/329 |
| 2011/0004804 A1* | 1/2011 | Xu et al. | 714/758 |
| 2011/0044268 A1* | 2/2011 | Choi | H04J 11/0069 370/329 |
| 2011/0134825 A1* | 6/2011 | Kim et al. | 370/312 |
| 2011/0141876 A1* | 6/2011 | Kuchi et al. | 370/203 |
| 2011/0274065 A1* | 11/2011 | Oh | H04W 72/121 370/329 |
| 2012/0002527 A1* | 1/2012 | Minemura et al. | 369/59.21 |
| 2012/0051307 A1* | 3/2012 | Huang et al. | 370/329 |
| 2012/0087331 A1* | 4/2012 | Seo | H04L 5/0044 370/329 |
| 2014/0105227 A1* | 4/2014 | Maheshwari et al. | 370/474 |
| 2014/0205029 A1* | 7/2014 | Srinivasa | H04L 1/0016 375/260 |

OTHER PUBLICATIONS

Notice of Patent Grant dated Jun. 13, 2016 in connection with Korean Patent Application No. 10-2010-0050276.

Korean Office Action issued for KR 10-2010-0050276 dated Feb. 11, 2016, 12 pgs.

Intel Corporation, "Space-Frequency Bit-Interleaved Coded Modulation for MIMO-OFDM/OFDMA Systems", IEEE 802.16 Broadband Wireless Access Working Group <http://ieee802.org/16>, IEEE C802.16e-04/533r4, Jan. 25, 2005, 11 pgs.

LG Electronics, "Tone Allocation Rule for IEEE 802.16m CTC", IEEE C802.16m-09/0315, Jan. 7, 2009, 4 pgs.

* cited by examiner

APPARATUS AND METHOD FOR RESOURCE SEGMENTATION IN WIRELESS COMMUNICATION SYSTEM

CROSS-REFERENCE TO RELATED APPLICATION(S) AND CLAIM OF PRIORITY

This present application claims the benefit under 35 U.S.C. §119 to an application filed in the Korean Intellectual Property Office on May 28, 2010 and assigned Serial No. 10-2010-0050276, the contents of which is herein incorporated by reference.

TECHNICAL FIELD OF THE INVENTION

The present invention relates to resource segmentation of a wireless communication system. More particularly, the present invention relates to an apparatus and a method for efficiently distributing an allocated resource to modulated data in transmitting data encoded and modulated using a plurality of Forward Error Correction (FEC) blocks in an Orthogonal Frequency Division Multiplexing (OFDM) wireless communication system.

BACKGROUND OF THE INVENTION

The Institute of Electrical and Electronics Engineers (IEEE) 802.16 standard is a wireless communication system that uses a signal transmission scheme called Orthogonal Frequency Division Multiplexing (OFDM) in order to provide a high speed data service even when a user is on the move, and employs an Orthogonal Frequency Division Multiple Access (OFDMA) based on the OFDM in order to raise spectrum use efficiency even more.

Generally, data is mapped to a radio resource and transmitted in a wireless communication system. Transmission data goes through a channel encoding (Forward Error Correction (FEC)) process, as a technique that may compensate for an error occurring during data transmission, and a modulation process. When data size is large, the data cannot be processed using a single FEC block, so channel encoding is performed through a plurality of FEC blocks. In this situation, an output of each FEC block is modulated by a modulation process and then mapped to an allocated resource and transmitted. For this purpose, an entire allocated resource needs to be divided depending on the number of FEC blocks. Generally, an entire allocated resource includes a set of a plurality of resource units with a predetermined size (for example, a Logical Resource Unit (LRU)). In addition, the allocated resource includes not only a resource (data tone) for data transmission but also a resource (pilot tone) for channel estimation. The number of the resources may change depending on requirements thereof. Generally, the number of pilot tones in a resource unit with a predetermined size has a different value depending on the number of Multiple-Input Multiple-Output (MIMO) streams.

Therefore, for mapping data encoded and modulated using a plurality of FEC blocks to a resource allocated into each FEC block of an entire resource, a resource for data transmission among the entire resource needs to consider the number of MIMO streams as well as the number of FEC blocks to perform effective resource segmentation.

Therefore, there is a need for an apparatus and a method for resource segmentation that are effective when a plurality of FEC blocks is used in a wireless communication system.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide an apparatus and a method for resource segmentation that are effective when a plurality of FEC blocks is used in a wireless communication system.

In accordance with an aspect of the present invention, a method for resource segmentation in a wireless communication system is provided. The method includes distributing a data information bit to one or more Forward Error Correction (FEC) blocks with consideration of a size of the data information bit. A number of data tones is determined based on control information with respect to each of the one or more FEC blocks. The data information bit distributed to the one or more FEC blocks is mapped into a data tone with consideration of the number of data tones determined for each of the one or more FEC blocks.

In accordance with another aspect of the present invention, an apparatus for resource segmentation in a wireless communication system is provided. The apparatus includes a Media Access Control (MAC) layer unit for distributing a data information bit to one or more Forward Error Correction (FEC) blocks with consideration of a size of the data information bit. A resource mapping unit determines the number of data tones based on control information with respect into each of the one or more FEC blocks and maps the data information bit distributed to the one or more FEC blocks into a data tone with consideration of the number of data tones determined for each of the one or more FEC blocks.

In accordance with another aspect of the present invention, a method for transmitting data in a wireless communication system is provided. The method includes distributing a data information bit to one or more Forward Error Correction (FEC) blocks with consideration of a size of the data information bit. The distributed data information bits are channel-coded for each FEC block. The channel-coded data information bit is modulated to generate modulation symbols for each FEC block. The modulation symbols are mapped into a data tone for each FEC block basis. The modulation symbols mapped to the data tone are transmitted using an Orthogonal Frequency Division Multiplexing (OFDM) scheme, wherein the number of data tones for each FEC block basis is determined with consideration of at least one of the number of data streams to be transmitted via a multiple antenna, a subframe type, and the number of FEC blocks.

In accordance with yet another aspect of the present invention, an apparatus for transmitting data in a wireless communication system is provided. The apparatus includes a Media Access Control (MAC) layer unit for distributing a data information bit to one or more Forward Error Correction (FEC) blocks with consideration of a size of the data information bit. A plurality of FEC units channel-codes the distributed data information bits for each FEC block. A modulator modulates the channel-coded data information bit to generate modulation symbols for each FEC block. A resource mapping unit maps the modulation symbols into a data tone for each FEC block basis. An OFDM modulator transmits the modulation symbols mapped to the data tone using an Orthogonal Frequency Division Multiplexing (OFDM) scheme, wherein the number of data tones for each FEC block basis is determined with consideration of at least one of the number of data streams to be transmitted via a multiple antenna, a subframe type, and the number of FEC blocks.

Other aspects, advantages, and salient features of the invention will become apparent to those skilled in the art from the following detailed description which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein with reference to the accompanying drawings. In the following description, detailed descriptions of well-known functions or constructions will be omitted because they would obscure the invention in unnecessary detail. Also, the terms used herein are defined according to the functions of the present invention. Thus, the terms may vary, depending on the user's or operator's intentions or practices. Therefore, the terms used herein should be understood based on the descriptions made herein.

Embodiments of the present invention provide an apparatus and a method for resource segmentation in a wireless communication system. More particularly, embodiments of the present invention provide an apparatus and a method for removing generation of an operational problem and determining the number of resources (or the number of data tones) used depending on the number of FEC blocks in order to reduce complexity when mapping resources by dividing the number of data tones that change depending on the number of data streams and a subframe type by the number of FEC blocks.

Figure 1:
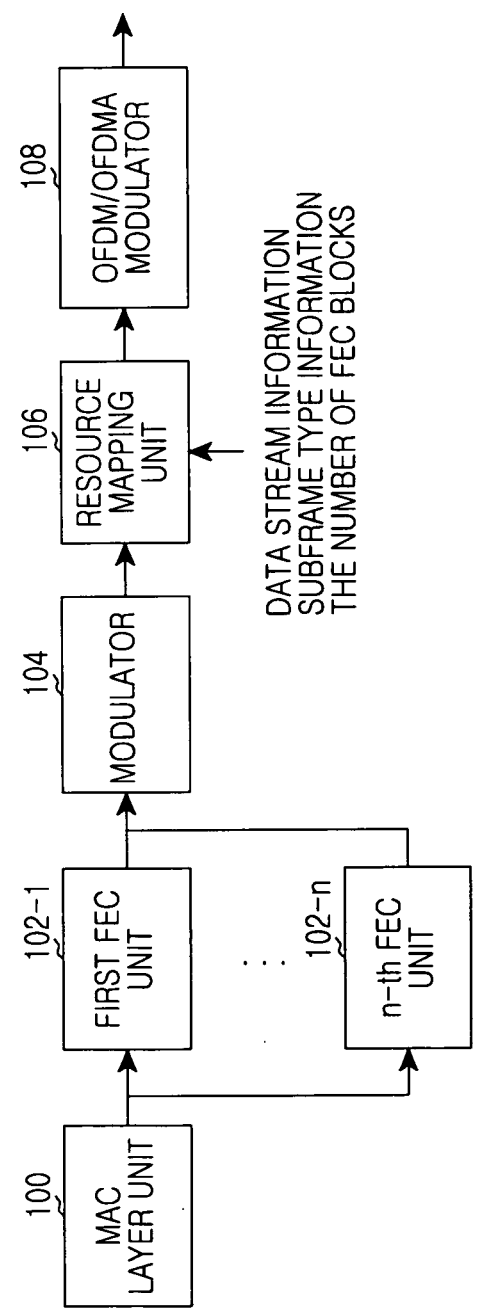
FIG. 1 illustrates a transmitter for distributing a resource in a wireless communication system according to an embodiment of the present invention.

FIG. 1 illustrates a transmitter for distributing a resource in a wireless communication system according to an embodiment of the present invention.

Referring to FIG. 1, the transmitter includes a MAC layer unit 100, a plurality of FEC units 102-1 to 102-n, a modulator 104, a resource mapping unit 106, and an OFDM/OFDMA modulator 108.

The MAC layer unit 100 generates control information for the MAC layer and outputs the control information to the plurality of FEC units 102-1 to 102-n. In addition, the MAC layer unit 100 outputs data from an upper layer to the plurality of FEC units 102-1 to 102-n. Here, since a data size accommodated by the FEC units 102-1 to 102-n is limited, when the data size is large, the MAC layer unit 100 segments the data to output the same to the plurality of FEC units 102-1 to 102-n.

Each of the FEC units 102-1 to 102-n encodes data and a control bit sequence from the MAC layer unit 100 to generate code symbols. For example, the FEC units 102-1 to 102-n may be an encoder that uses a Convolutional Code (CC), an encoder that uses a Block Turbo Code (BTC), an encoder that uses a Convolutional Turbo Code (CTC), and an encoder that uses a Zero Tailing Convolutional Code (ZT-CC).

The modulator 104 modulates the encoded symbols from the FEC units 102-1 to 102-n using a predetermined modulation scheme to generate modulation symbols. For example, the modulator 104 may modulate the encoded symbols using a modulation scheme such as Quadrature Phase Shift Keying (QPSK), 16 Quadrature Amplitude Modulation (QAM), 32QAM, and 64QAM.

The resource mapping unit 106 maps modulation symbols from the modulator 104 into a frequency space in order to transmit the modulation symbols via a plurality of subcarriers that include mutual orthogonality. That is, the resource mapping unit 106 maps modulation symbols from the modulator 104 into a plurality of subcarriers.

When data is generated and transmitted based on a plurality of FEC blocks, an entire allocated resource (entire data tone) needs to be segmented depending on the number of FEC blocks. An amount of a resource (or the number of data tones) used for data transmission among an actually allocated resource is influenced by a frame structure and the number of MIMO streams (that is, the number of data streams transmitted via a plurality of antennas). A basic unit of a resource to be allocated may have a different number of data tones depending on a subframe type, and may have a different number of data tones depending on the number of MIMO streams even in the same subframe type. For example, four subframe types exist in IEEE 802.16m, and are denoted by types '1', '2', '3', and '4', respectively. A basic resource unit in each subframe is expressed using a Logical Resource Unit (LRU), and the number of OFDMA symbols forming an LRU changes depending on a subframe type. That is, types '1', '2', '3', and '4' include 6, 7, 5, and 9 OFDMA symbols, respectively. In addition, the number of pilot tones in each LRU changes depending on an MIMO operation used for data transmission (refer to FIGS. 2A to 7C).

Therefore, the resource mapping unit 106 determines the number of data tones to be allocated to respective FEC blocks with consideration of the number of data streams, a subframe type, and the number of FEC blocks to be transmitted via a multiple antenna, and then maps modulation symbols from the FEC units 102-1 to 102-$n$ to subcarriers based on a data tone allocated to each of the FEC blocks.

According to an embodiment of the present invention, the resource mapping unit 106 determines whether an entire allocated resource (or data tones) are segmented to respective FEC blocks depending on the number of FEC blocks used, a subframe type, and the number of MIMO streams (or the number of data streams) using Equation (1). In Equation (1), consideration of a subframe type is not shown. This is because a problem that may occur during resource segmentation may be resolved with consideration of only the number of MIMO streams.

$$N_{RE,k} = K_{RS} \cdot \left\lfloor \frac{\frac{N_{RE}}{K_{RS}} + (K_{FB} - k - 1)}{K_{FB}} \right\rfloor, 0 \le k \le K_{FB} \quad [\text{Eqn. 1}]$$

$N_{RE}$ is the number of data tones among an entire allocated resource, k is an FEC block index, $N_{RE,k}$ is the number of data tones to be allocated to a k-th FEC block, $K_{FB}$ is the number of FEC blocks, $K_{RS}$ is a parameter value depending on the number of MIMO streams. Here, $K_{RS}$='1' for MIMO stream='1' and $K_{RS}$='2' for MIMO stream >'1'. That is, a resource segmentation problem that may occur depending on a subframe type and the number of MIMO streams is resolved through the $K_{RS}$.

The OFDM/OFDMA modulator 108 OFDM-modulates resource-mapped data from the resource mapping unit 106 to generate an OFDM symbol. Here, the OFDM modulation includes Inverse Fast Fourier Transform (IFFT) and Cyclic Prefix (CP) insertion.

As described above, a basic resource unit in each subframe is expressed by a Logical Resource Unit (LRU), and one LRU includes eighteen ('18') contiguous subcarriers and six ('6') OFDMA symbols. In realization, an LRU includes '5', '7', or '9' OFDMA symbols depending on a subframe type. FIGS. 2A to 7C illustrate examples in which the number of pilot tones changes depending on the number of data streams in an LRU.

Figure 2A:
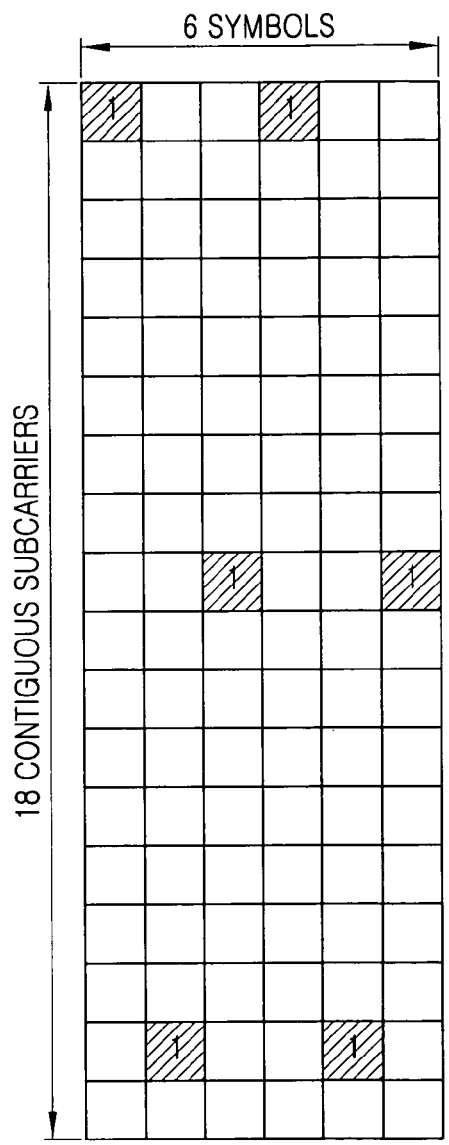
FIGS. 2A and 2B illustrate a pilot pattern for one data stream according to an embodiment of the present invention.
Figure 2B:
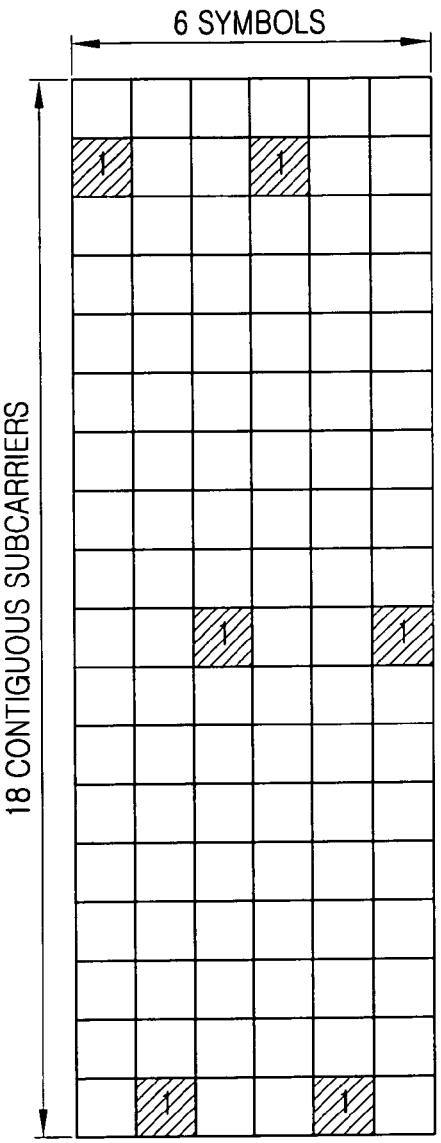

FIGS. 2A and 2B illustrate a pilot pattern for one data stream according to an embodiment of the present invention.

Pilot symbols in an LRU of FIG. 2A are arranged in a first subcarrier and a first OFDMA symbol, a seventeenth subcarrier and a second OFDMA symbol, a ninth subcarrier and a third OFDMA symbol, the first subcarrier and a fourth OFDMA symbol, the seventeenth subcarrier and a fifth OFDMA symbol, and the ninth subcarrier and a sixth OFDMA symbol.

In another realization, pilot symbols in an LRU of FIG. 2B are arranged in a second subcarrier and the first OFDMA symbol, an eighteenth subcarrier and the second OFDMA symbol, a tenth subcarrier and the third OFDMA symbol, the second subcarrier and the fourth OFDMA symbol, an eighteenth subcarrier and the fifth OFDMA symbol, and the tenth subcarrier and the sixth OFDMA symbol.

Figure 3A:
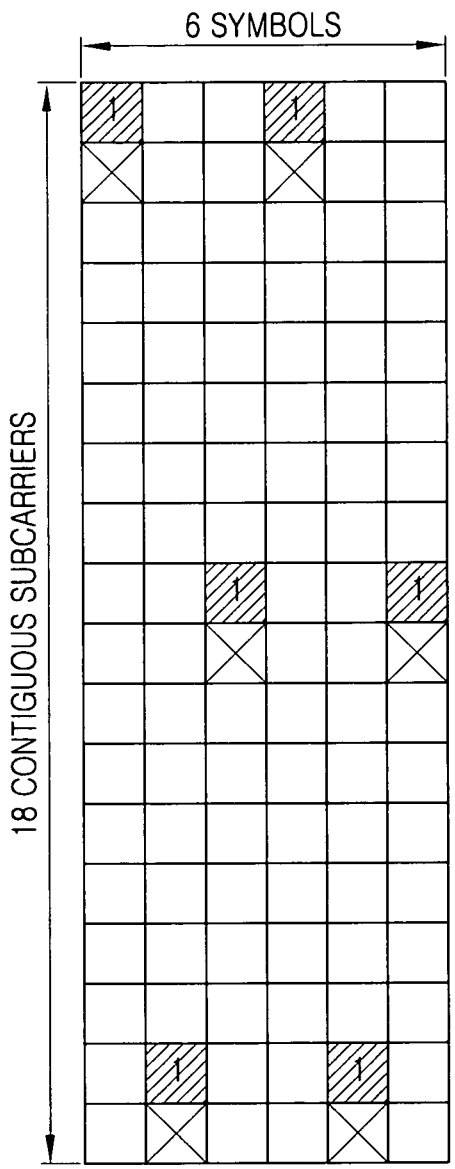
FIGS. 3A and 3B illustrate a pilot pattern for two data streams according to an embodiment of the present invention.
Figure 3B:
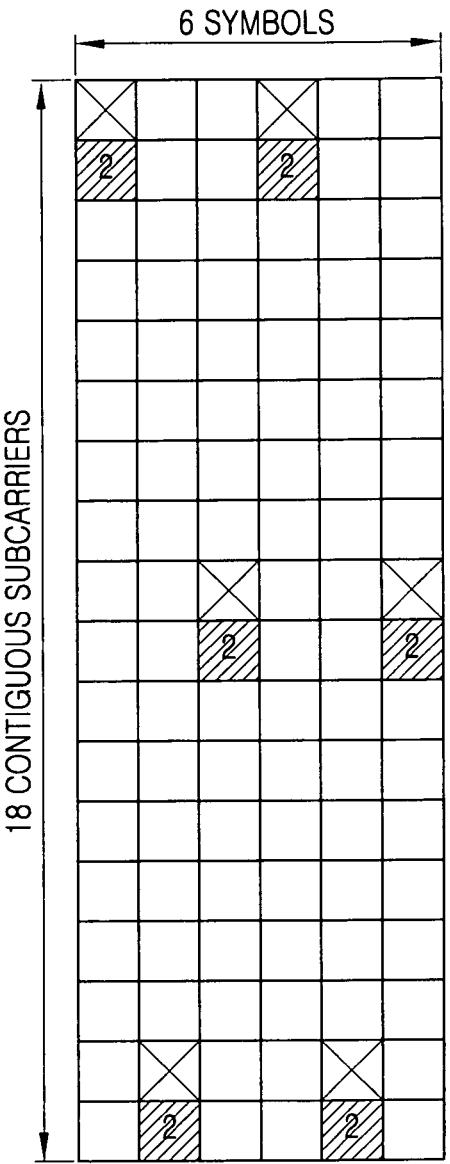

FIGS. 3A and 3B illustrate a pilot pattern for two data streams according to an embodiment of the present invention.

FIG. 3A illustrates pilot patterns for a first data stream, and FIG. 3B illustrates pilot patterns for a second data stream.

Here, when pilot symbols for the first data stream are arranged, pilot symbols for the second data stream cannot be used as a data tone. Likewise, when pilot symbols for the second data stream are arranged, pilot symbols for the first data stream cannot be used as a data tone.

Figure 4C:
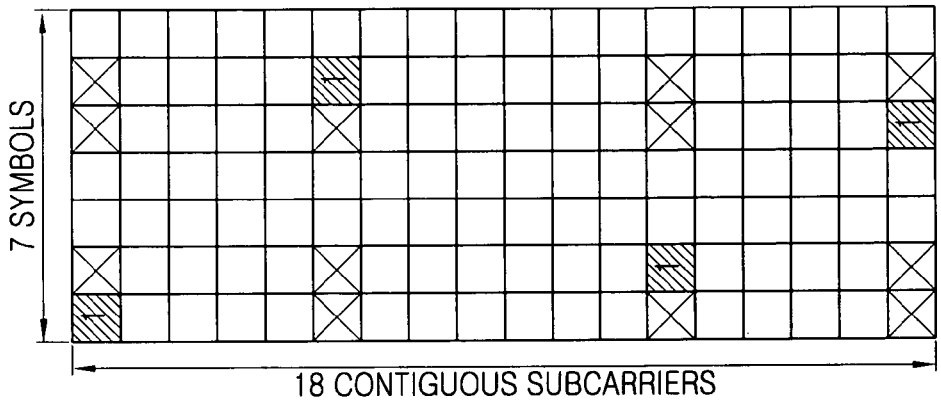
FIGS. 4A-4C illustrate pilot patterns for a first of four data streams according to an embodiment of the present invention.
Figure 4B:
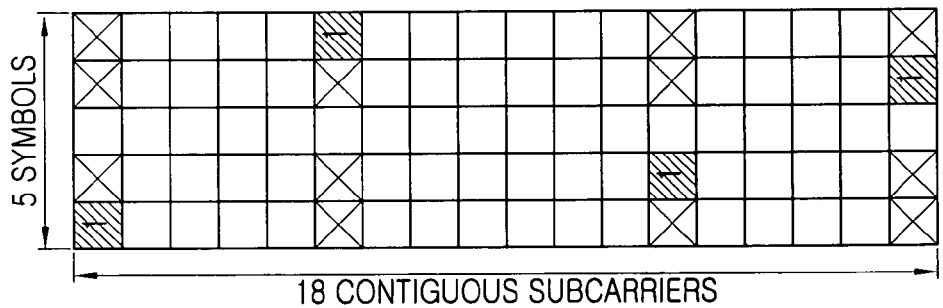
Figure 4A:
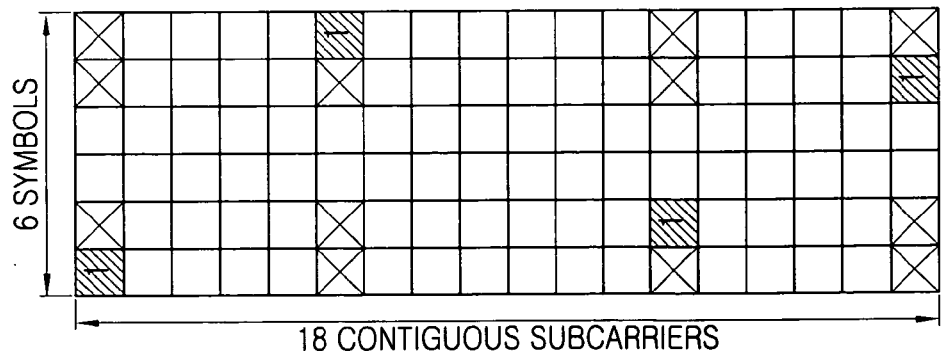

FIGS. 4A-4C illustrate pilot patterns for a first of four data streams according to an embodiment of the present invention.

FIG. 4A illustrates a pilot pattern for the first data stream when an LRU includes eighteen ('18') contiguous subcarriers and six ('6') OFDMA symbols. FIG. 4B illustrates a pilot pattern for the first data stream when an LRU includes eighteen ('18') contiguous subcarriers and five ('5') OFDMA symbols. FIG. 4C illustrates a pilot pattern for the first data stream when an LRU includes eighteen ('18') contiguous subcarriers and seven ('7') OFDMA symbols.

At this point, when the first pilot symbols are arranged in FIGS. 4A, 4B, and 4C, pilot symbols for a second data stream, a third data stream, and a fourth data stream are not used as data symbols.

Figure 5C:
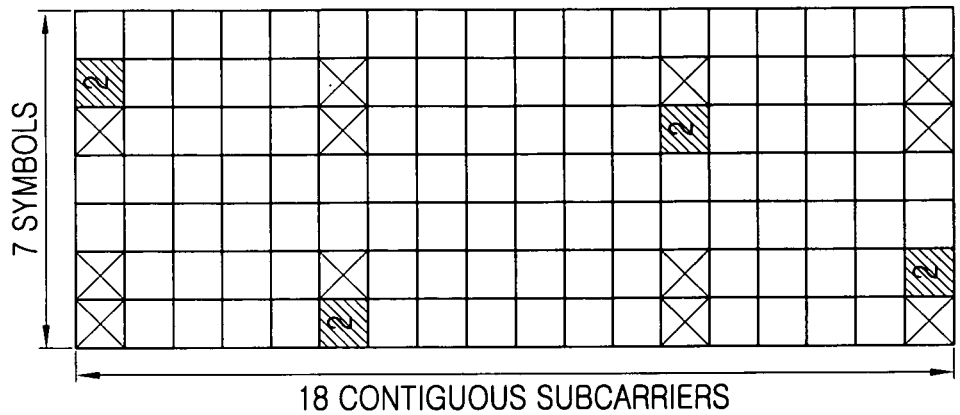
FIGS. 5A-5C illustrate pilot patterns for a second of four data streams according to an embodiment of the present invention.
Figure 5B:
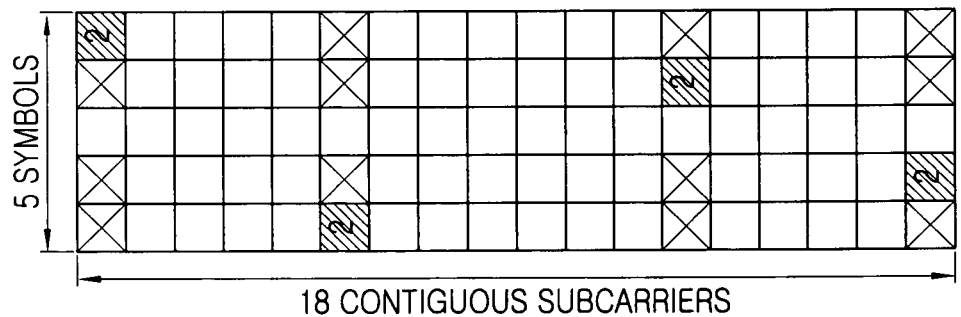
Figure 5A:
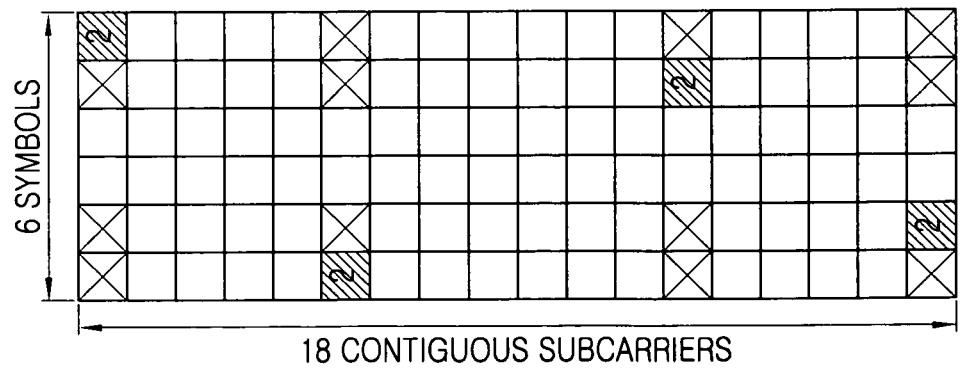

FIGS. 5A-5C illustrate pilot patterns for a second of four data streams according to an embodiment of the present invention.

FIG. 5A illustrates a pilot pattern for the second data stream when an LRU includes eighteen ('18') contiguous subcarriers and six ('6') OFDMA symbols, FIG. 5B illustrates a pilot pattern for the second data stream when an LRU includes eighteen ('18') contiguous subcarriers and five ('5') OFDMA symbols, and FIG. 5C illustrates a pilot pattern for the second data stream when an LRU includes eighteen ('18') contiguous subcarriers and seven ('7') OFDMA symbols.

At this point, when the second pilot symbols are arranged in FIGS. 5A, 5B, and 5C, pilot symbols for a first data stream, a third data stream, and a fourth data stream are not used as data symbols.

Figure 6C:
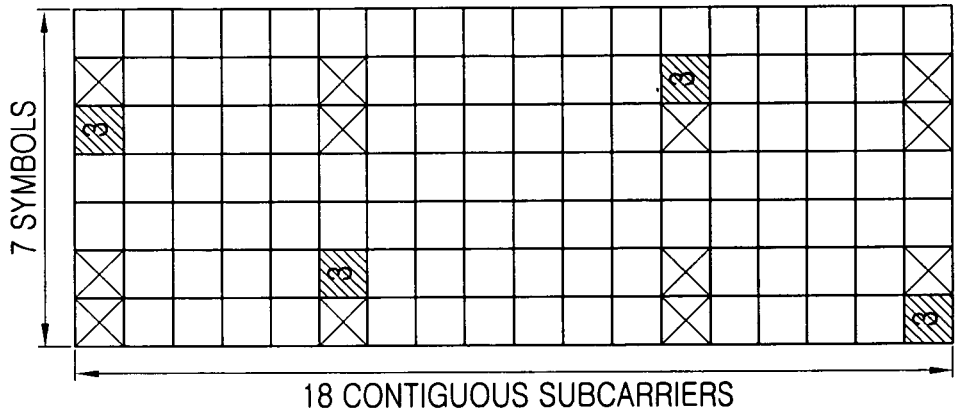
FIGS. 6A-6C illustrate pilot patterns for a third of four data streams according to an embodiment of the present invention.
Figure 6B:
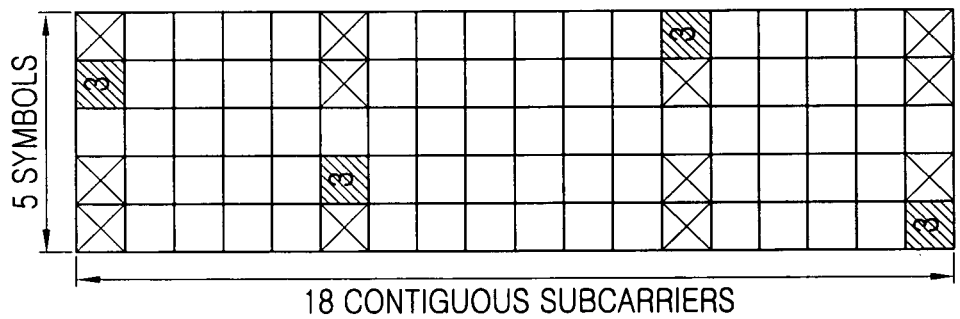
Figure 6A:
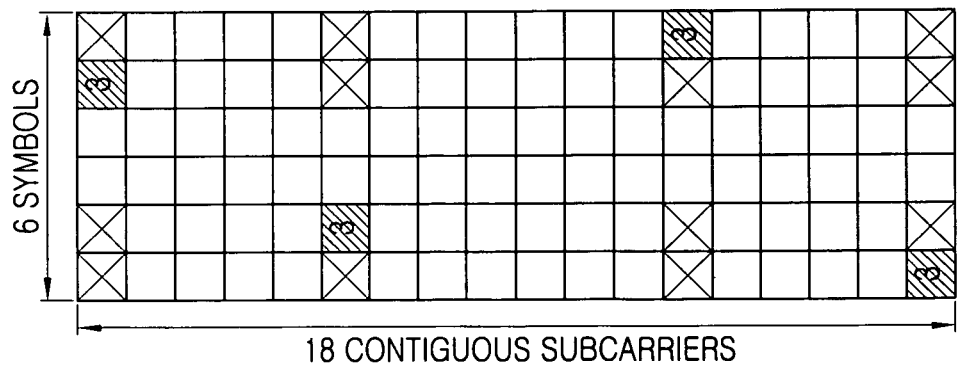

FIGS. 6A-6C illustrate pilot patterns for a third of four data streams according to an embodiment of the present invention.

FIG. 6A illustrates a pilot pattern for the third data stream when an LRU includes eighteen ('18') contiguous subcarriers and six ('6') OFDMA symbols, FIG. 6B illustrates a pilot pattern for the third data stream when an LRU includes eighteen ('18') contiguous subcarriers and five ('5') OFDMA symbols, and FIG. 6C illustrates a pilot pattern for the third data stream when an LRU includes eighteen ('18') contiguous subcarriers and seven ('7') OFDMA symbols.

At this point, when the third pilot symbols are arranged in FIGS. 6A, 6B, and 6C, pilot symbols for a first data stream, a second data stream, and a fourth data stream are not used as data symbols.

Figure 7C:
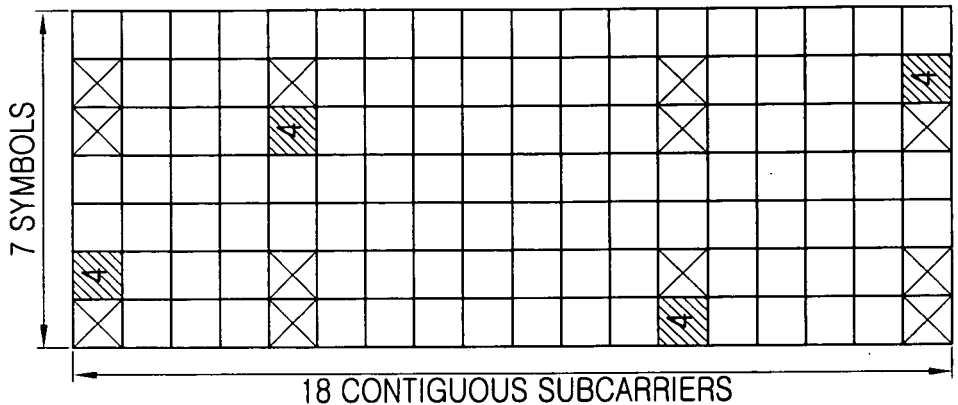
FIGS. 7A-7C illustrate pilot patterns for a fourth of four data streams according to an embodiment of the present invention.
Figure 7B:
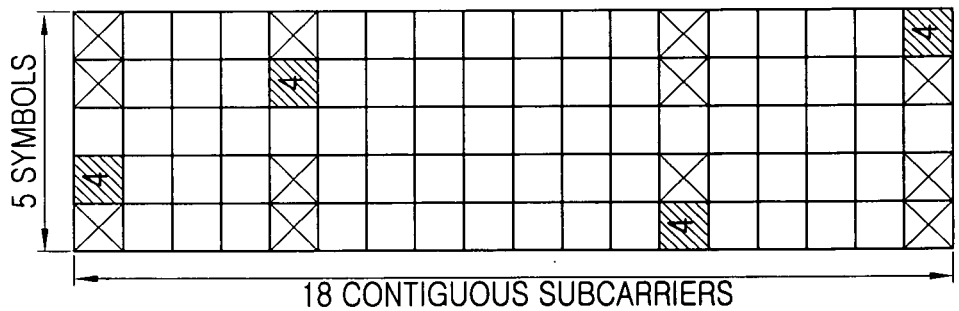
Figure 7A:
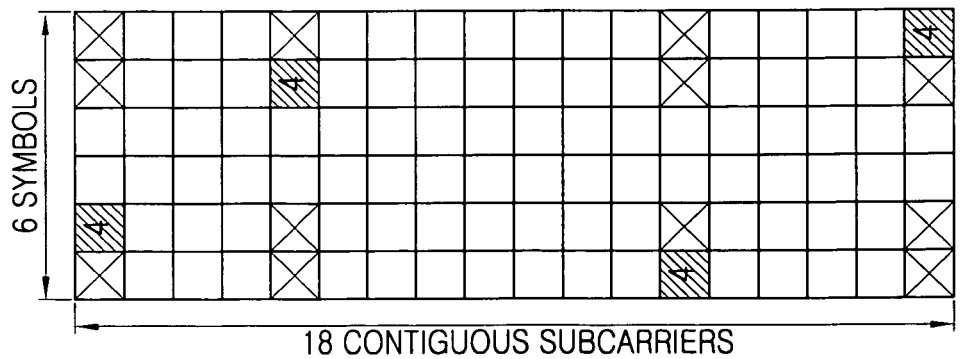

FIGS. 7A-7C illustrate pilot patterns for a fourth of four data streams according to an embodiment of the present invention.

FIG. 7A illustrates a pilot pattern for the fourth data stream when an LRU includes eighteen ('18') contiguous subcarriers and six ('6') OFDMA symbols, FIG. 7B illustrates a pilot pattern for the fourth data stream when an LRU includes eighteen ('18') contiguous subcarriers and five ('5') OFDMA symbols, and FIG. 7C illustrates a pilot pattern for the fourth data stream when an LRU includes eighteen ('18') contiguous subcarriers and seven ('7') OFDMA symbols.

At this point, when the fourth pilot symbols are arranged in FIGS. 7A, 7B, and 7C, pilot symbols for a first data stream, a second data stream, and a third data stream are not used as data symbols.

Referring to FIGS. 2A to 7C, the number of data tones changes depending on the number of data streams and a subframe type.

Figure 8:
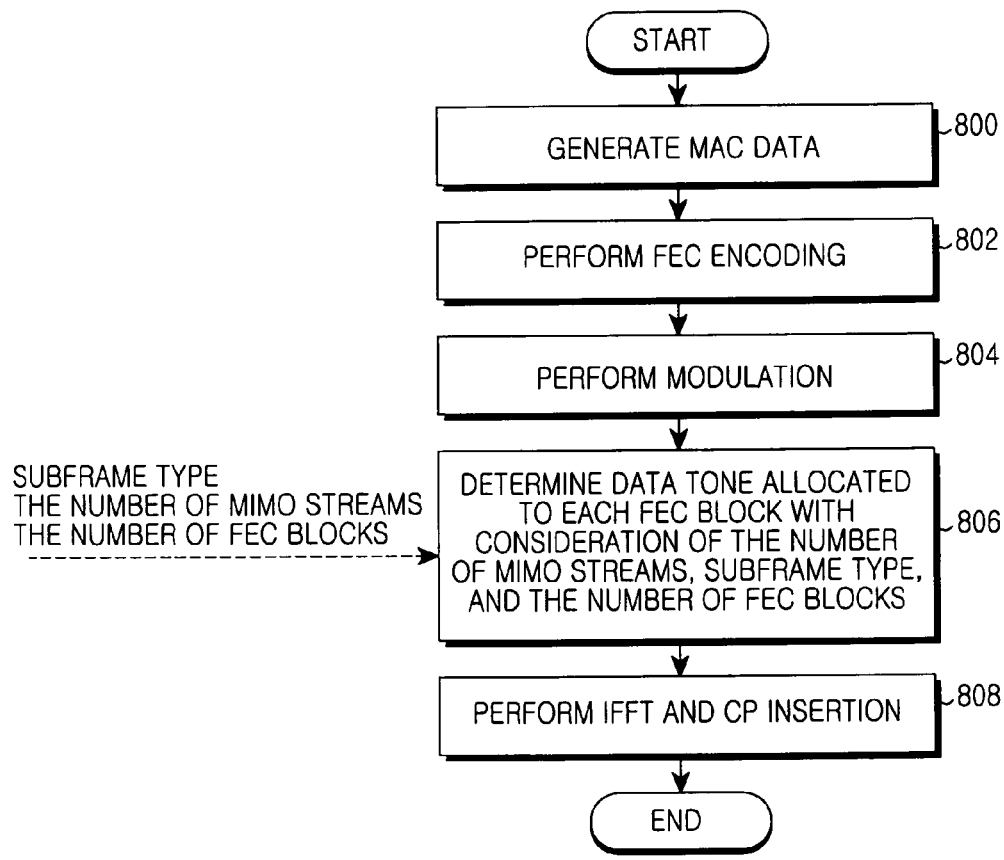
FIG. 8 illustrates a process for resource segmentation according to an embodiment of the present invention.

FIG. 8 illustrates a process for resource segmentation according to an embodiment of the present invention.

Referring to FIG. 8, a transmitter generates control information at an MAC layer or generates data from an upper layer as MAC data in block 800. When the MAC data is large, the transmitter divides the MAC data such that the MAC data is segmented to a plurality of FEC blocks.

The transmitter encodes a MAC data information bit line to generate code symbols in block 802. For example, the transmitter encodes the MAC data using one of an encoder that uses a Convolutional Code (CC), an encoder that uses a Block Turbo Code (BTC), an encoder that uses a Convolutional Turbo Code (CTC), and an encoder that uses a Zero Tailing Convolutional Code (ZT-CC).

The transmitter modulates code symbols using a predetermined modulation scheme to generate modulation symbols in block 804. For example, the transmitter may perform modulation using a modulation scheme such as Quadrature Phase Shift Keying (QPSK), 16 Quadrature Amplitude Modulation (QAM), 32QAM, and 64QAM.

The transmitter determines the number of data tones to be allocated to respective FEC blocks with consideration of the number of MIMO streams, a subframe type, and the number of the FEC blocks, and then maps modulation symbols into subcarriers based on a data tone allocated to each of the FEC blocks in block 806.

That is, when data is generated and transmitted based on a plurality of FEC blocks, an allocated entire data tone needs to be segmented depending on the number of FEC blocks. The number of data tones used for data transmission among an actually allocated resource is influenced by a frame structure and the number of MIMO streams (that is, the number of data streams transmitted via a plurality of antennas). A basic unit of a resource to be allocated may have a different number of data tones depending on a subframe type, and may have a different number of data tones depending on the number of MIMO streams even in the same subframe type.

The transmitter determines whether an entire allocated resource (or data tones) is segmented to respective FEC blocks depending on the number of FEC blocks used, a subframe type, and the number of MIMO streams (or the number of data streams) using Equation (1).

The transmitter OFDM-modulates resource-mapped data to generate an OFDM symbol in block 808. Here, the OFDM modulation includes Inverse Fast Fourier Transform (IFFT) and Cyclic Prefix (CP) insertion.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of a base station (BS) in a wireless communication system, the method comprising:
identifying, by the BS, a number of a plurality of data tones allocated to at least one data stream for multiple input multiple output (MIMO);
identifying, by the BS, a number of at least one encoding block for encoding the at least one data stream and a number of the at least one data stream;
determining, by the BS, a number of data tones to be allocated to each of the at least one encoding block based on the number of the plurality of data tones, the number of the at least one encoding block, and a value determined based on the number of the at least one data stream; and
transmitting the at least one data stream based on the determined number of data tones,
wherein the value is determined as a first value, if the number of the at least one data stream is 1, and is determined as a second value, if the number of the at least one data stream is greater than 1.

2. The method of claim 1, wherein each of the at least one encoding block is a forward error correction (FEC) block.

3. The method of claim 1, wherein determining the number of data tones to be allocated to each of the at least one encoding block comprising:
determining the number of data tones to be allocated to each of the at least one encoding block based on a following equation:

$$N_{RE,k} = K_{RS} \cdot \left\lfloor \frac{\frac{N_{RE}}{K_{RS}} + (K_{FB} - k - 1)}{K_{FB}} \right\rfloor, 0 \le k \le K_{FB}$$

where $N_{RE}$ denotes the identified number of the plurality of data tones, k denotes an index regarding each of the at least one encoding block, $N_{RE,k}$ denotes a number of data tones to be allocated to a k-th encoding block among the at least one encoding block, $K_{FB}$ denotes the number of the at least one encoding block, $K_{RS}$ denotes the value determined according to the number of the at least one data stream, wherein $K_{RS}=1$ if the number of the at least one data stream is 1, and $K_{RS}=2$ if the number of the at least one data stream is greater than 1.

4. The method of claim 1, wherein the number of at least one encoding block is determined based on a size of the at least one data stream.

5. The method of claim 1, further comprising:
generating encoded symbols regarding the at least one data stream by encoding bit sequences to be received from a higher layer; and
generating modulated symbols regarding the at least one data stream by modulating the encoded symbols.

6. The method of claim 5, further comprising:
generating data by mapping the modulated symbols to a plurality of subcarriers, based on the number of data tones to be allocated to each of the at least one encoding block.

7. The method of claim 6, further comprising:
generating orthogonal frequency division multiplexing (OFDM) symbols by modulating the data based on a OFDM scheme.

8. An apparatus of a base station (BS) in a wireless communication system, the apparatus comprising:
a resource mapping device configured to:
identify a number of a plurality of data tones allocated to at least one data stream for multiple input multiple output (MIMO);
identify a number of at least one encoding block for encoding the at least one data stream and a number of the at least one data stream; and
determine a number of data tones to be allocated to each of the at least one encoding block based on the number of the plurality of data tones, the number of the at least one encoding block, and a value determined based on the number of the at least one data stream; and
a transmitter configured to transmit the at least one data stream based on the determined number of data tones,
wherein the value is determined as a first value, if the number of the at least one data stream is 1, and is determined as a second value, if the number of the at least one data stream is greater than 1.

9. The apparatus of claim 8, wherein each of the at least one encoding block is a forward error correction (FEC) block.

10. The apparatus of claim 8, wherein the resource mapping device configured to determine the number of data tones to be allocated to each of the at least one encoding block based on a following equation:

$$N_{RE,k} = K_{RS} \cdot \left\lfloor \frac{\frac{N_{RE}}{K_{RS}} + (K_{FB} - k - 1)}{K_{FB}} \right\rfloor, 0 \le k \le K_{FB}$$

where $N_{RE}$ denotes the identified number of the plurality of data tones, k denotes an index regarding each of the at least one encoding block, $N_{RE,k}$ denotes a number of data tones to be allocated to a k-th encoding block among the at least one encoding block, $K_{FB}$ denotes the number of the at least one encoding block, $K_{RS}$ denotes the value determined according to the number of the at least one data stream, wherein $K_{RS}=1$ if the number of the at least one data stream is 1, and $K_{RS}=2$ if the number of the at least one data stream is greater than 1.

11. The apparatus of claim 8, wherein the number of at least one encoding block is determined based on a size of the at least one data stream.

12. The apparatus of claim 8, further comprising:
an encoding device configured to generate encoded symbols regarding the at least one data stream by encoding bit sequences to be received from a higher layer; and
a modulation device configured to generate modulated symbols regarding the at least one data stream by modulating the encoded symbols.

13. The apparatus of claim 12, wherein the resource mapping device is further configured to generate data by mapping the modulated symbols to a plurality of subcarriers, based on the number of data tones to be allocated to each of the at least one encoding block.

14. The apparatus of claim 13, further comprising:
the modulation device configured to generate orthogonal frequency division multiplexing (OFDM) symbols by modulating the data based on a OFDM scheme.

15. The method of claim 1, wherein the number of data tones to be allocated to each of the at least one encoding block is determined based on a subframe type.

16. The apparatus of claim 8, wherein the number of data tones to be allocated to each of the at least one encoding block is determined based on a subframe type.

* * * * *